United States Patent [19]

Terada

[11] 4,109,973
[45] Aug. 29, 1978

[54] VEHICLE SEAT SLIDE ADJUSTER INCLUDING INTEGRALLY FORMED PAWL AND PAWL LEVER

[75] Inventor: Takami Terada, Toyota, Japan

[73] Assignee: Aisin Seiki Kabushiki Kaisha, Japan

[21] Appl. No.: 792,884

[22] Filed: May 2, 1977

[30] Foreign Application Priority Data

May 3, 1976 [JP] Japan .................................. 51-55613

[51] Int. Cl.² ............................................. F16C 29/02
[52] U.S. Cl. .................................... 308/3 R; 74/533;
248/430; 308/6 R
[58] Field of Search ................. 308/3.6, 3.8, 3 R, 6 R,
308/207; 248/429, 430, 393–398; 74/533, 535,
536, 537; 312/341 R

[56] References Cited

U.S. PATENT DOCUMENTS

| 1,943,550 | 1/1934 | Potter | 248/430 |
| 2,006,149 | 6/1935 | Potter | 248/430 |
| 3,062,592 | 11/1962 | Allen | 308/3.6 |
| 3,790,234 | 2/1974 | Fuelling et al. | 308/3.6 X |

FOREIGN PATENT DOCUMENTS 1,365,966  9/1974  United Kingdom ..................... 308/3.8

Primary Examiner—Trygve M. Blix
Assistant Examiner—Douglas C. Butler
Attorney, Agent, or Firm—Oblon, Fisher, Spivak, McClelland & Maier

[57] ABSTRACT

A vehicle seat slide adjuster includes a pair of guide rails which are slidable relative to each other one being secured to a vehicle seat and the other secured to a vehicle stationary part, and a latch mechanism for locking the seat to its desired or selected position after the relative sliding movement between the guide rails. The latch mechanism includes a pawl provided on one of the guide rails, latch holes provided on the other of the guide rails, and a pawl actuating lever for actuating the engagement and disengagement of the pawl and the latch hole, wherein the pawl actuating lever and the pawl are integrally formed in one piece and disposed within one of the guide rails.

10 Claims, 3 Drawing Figures

VEHICLE SEAT SLIDE ADJUSTER INCLUDING INTEGRALLY FORMED PAWL AND PAWL LEVER

BACKGROUND OF THE INVENTION

1. Field of the Invention

This invention relates generally to adjustable seats for automobiles and more particularly to a seat slide adjuster mechanism having a pair of guide rails slidable relative to each other for supporting the vehicle seat for back and forth movement.

2. Description of the Prior Art

In a conventional device, a seat retaining mechanism for retaining the seat in a desired or adjusted position includes a detent member and a manually operable lever member connected to the detent by an appropriate connecting procedure, such as welding. The conventional seat adjuster device is also designed to provide a bracket or connecting pin attached to a fixed or stationary guide rail for pivotally supporting the manual lever member.

Such a conventionally constructed device is shown, for example, in U.S. Pat. No. 3,062,592 patented on Nov. 6, 1962. In this patent, a detent member 14; 16 and a manually operable lever 22 are separately formed and are then connected to each other by means of rivets 23. A supporting means 15 (in this case pivotal pin 15) is also provided on the detent member 14 for pivotally supporting the same as well as the lever 22 connected thereto, on a slidable rail 18.

The above conventional construction has several problems to be solved, which may be summarized as follows:

(a) The lever and the detent actuated thereby must be separately formed and thereafter both are connected to each other by means of appropriate connecting means (complexity of manufacturing procedure);

(b) there must be provided a further connecting means by which the lever detent assembly is operatively or pivotally supported on the stationary rail (increase in constructional parts); and (c) the lever portion must be positioned substantially apart from the guide rails in order to be swung about the pivotal point not to be interferred with by the rails (increase in required space within the limited vehicle interior space).

SUMMARY OF THE INVENTION

Therefore, it is an object of the present invention to provide an improved seat slide adjuster mechanism for obviating the above mentioned drawbacks.

According to the present invention, a manually operable lever and a detent member actuated thereby are formed in one piece at the same time without any connecting or fixing procedure, and thereafter they are disposed within a hollow portion of the guide rail without necessitating any extra supporting members.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
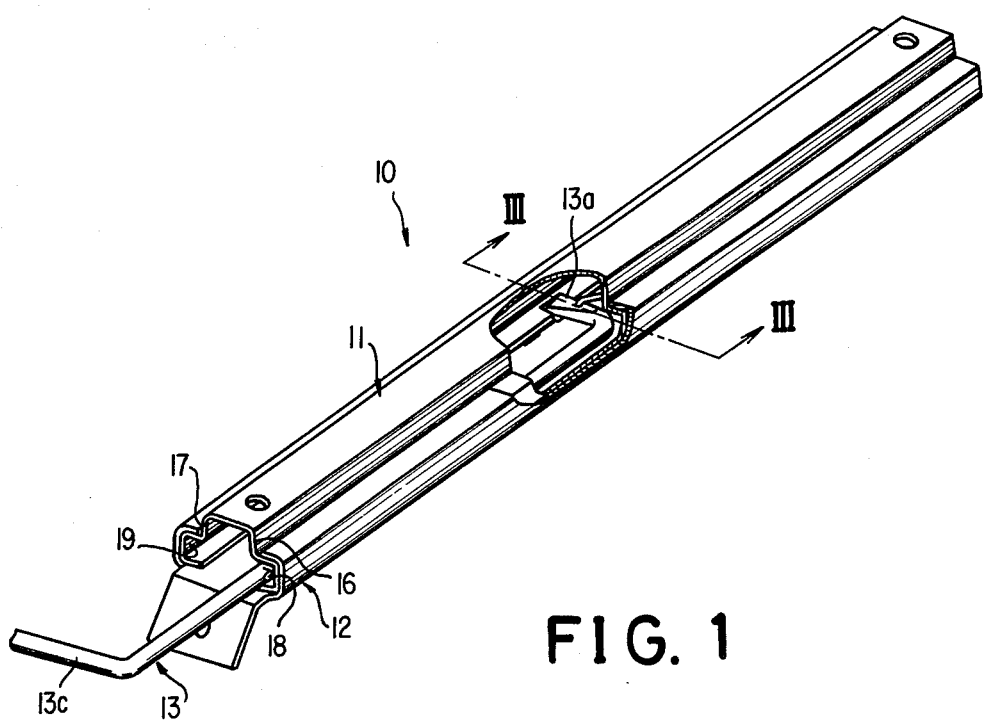
FIG. 1 is a perspective view of a preferred embodiment of the invention with parts cut away for showing the interior structure thereof.

Referring now to the drawings, a seat slide adjuster is generally designated by 10, which includes an upper guide rail 11 for supporting thereon a vehicle seat (not shown), a lower guide rail 12 capable of being fixedly secured to the floor (not shown) of the vehicle (not shown), a manually operable lever means 13 having a detent or pawl 13a at one end thereof, and a latch means 14 provided on the lower guide rail 12 for engaging with the pawl 13a.

The upper guide rail 11 is substantially of inverted U-shape in section and includes a flat base portion 15 upon which is secured to the vehicle seat, and a pair of side portions each having a downwardly depending side wall 16, 17 and an inwardly opposed channel 18, 19 formed continuously thereto.

One of the channels 18, 19, namely, the channel 19 of the guide rail 11 is provided with a recess 19a at middle portion with respect to the longitudinal direction of the rail 11.

Figure 3:
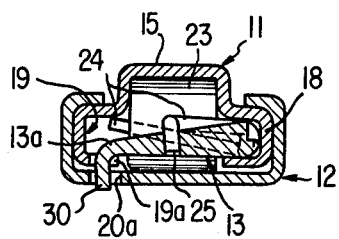
FIG. 3 is a cross-sectional view taken along the line III—III of FIG. 1.

The lower or stationary guide rail 12 is substantially of U-shaped in section and includes a flat base portion 20 and a pair of side portions each having an inwardly opposed channel 21, 22 within which is slidably disposed the aforementioned channels 18 and 19 respectively, as clearly shown in FIG. 1 or FIG. 3. The base portion 20 is provided with the latch means 14 including a plurality of rectangular latch holes 20a aligned in the longitudinal direction of the rail 12. These holes 20a are formed within the slidable surface of the channel 19 of the upper rail 11 so that the recess 19a of the channel 19 may selectively meet with each of the holes 20a during the relative sliding movement therebetween.

The manually operable lever means 13 includes the pawl 13a having a downwardly extending tooth 30, a shaft portion 13b disposed contiguous to and integral with pawl 13a and having a circular shape in section, and a lever 13c at the other end of the shaft portion 13b. All of the three portions 13a, 13b and 13c are formed in one piece of a round metal bar.

A pair of rollers 23 are rotatably disposed between the base portions 15 and 20 of the guide rails 11 and 12, respectively, for along the longitudinal axis thereof assisting the slidable movement of the guide rail 11 with respect to the stationary guide rail 12 as a roll bearing function therebetween. Further, a torsion spring 24 is shown for always biasing the pawl 13a to the engaging position with the holes 20a of the stationary rail 12. One end of the spring 24 is bent, laterally to be inserted between the channels 18, 19 of the upper guide rail 11 while the other end thereof is bent downwardly to the inserted in a hole 25 provided on the pawl 13a.

Figure 2:
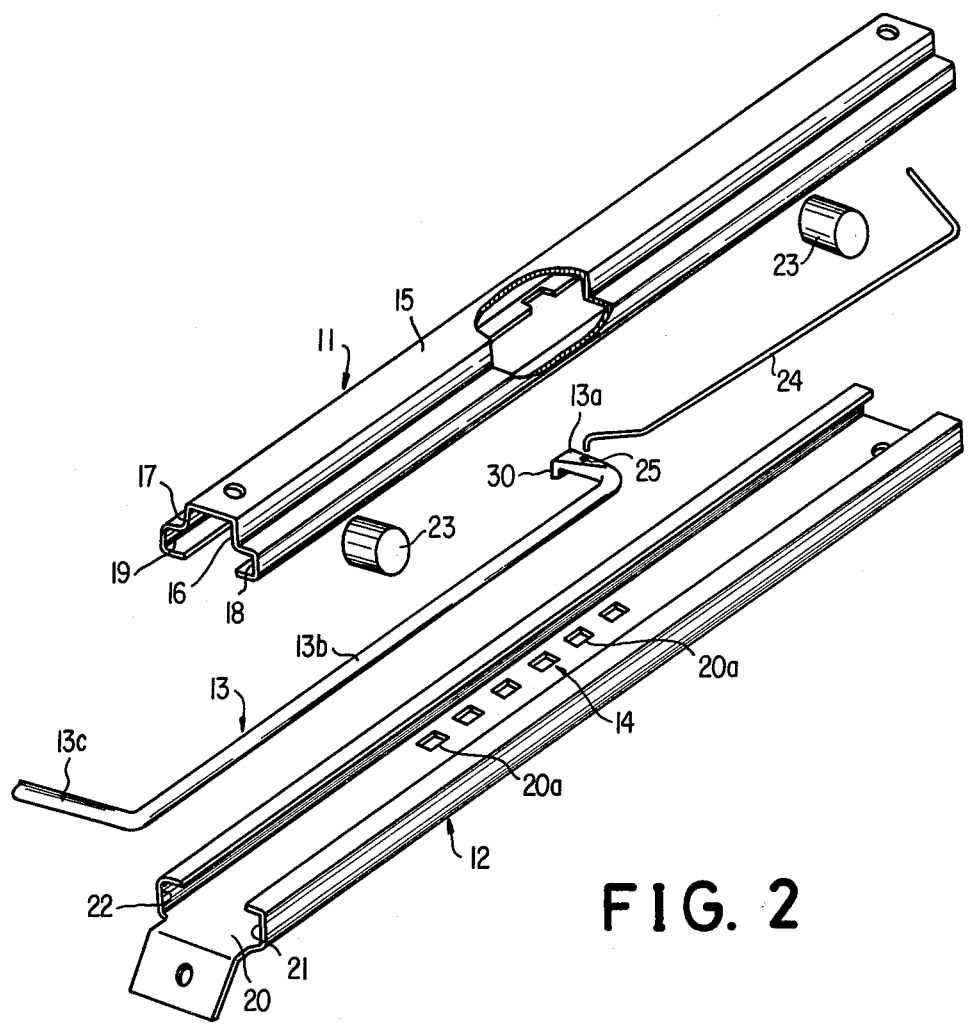
FIG. 2 is an exploded plan view of FIG. 1.

Now referring particularly to assembling of the adjuster mechanism with reference to FIG. 2, first the lever means 13 is disposed within the channel 18 of the guide rail 11 from left to right until the tooth 30 of the pawl 13a engages with recess 19a of the other channel 19, thereby axial position of the lever means 13 being defined. The torsion spring 24 is then also disposed within the channel 18 from the right to left until the downward bent end thereof is disposed within the hole 25 of the pawl 13a, thereby axial position of the spring 24 being defined. At this time the laterally bent end of the spring 24 is disposed between the two channels 18, 19 imparting a torsional effect between both ends of the spring 24. The rollers 23, 23 are then disposed within the upper guide rail 11 from both sides, (respectively, at this time in order to facilitate the insertion of the rollers the guide rail 11 is preferably reversed upside down). Finally, the channels 18, 19 of the upper guide rail 11 is telescopically disposed within the channels 21, 22 of the lower guide rail 12 from left to right. Since the shaft portion 13b is in contact with the inner surfaces of the channel 18 in the longitudinal direction and also since the pawl 13a is always biased to the downward direction, by the spring 24, the pawl 13a is easily engaged with one of the holes 20a of the lower guide rail 12 during the slidable insertion of the upper rail 11 into the lower guide rail 12. The lever portion 13c is swingable because of the bearing contact between the inner surfaces of the channel 18 and the shaft portion 13 b.

The thus assembled structure, as shown in FIG. 1, will be attached to the vehicle floor at both ends of the lower guide rail 12 and to the vehicle seat at both ends of the upper guide rail 11. However, in practical use, the seat slide guide rail assembly including upper and lower guide rails, may be provided with one pair being parallel with another and in the longitudinal direction of the vehicle body. It should be noted in such practical use that the adjuster mechanism consisting of manually operable lever means 13, latch holes 20a, etc. may be omitted from the other seat guide rail assembly.

In operation, when the lever portion 13c is rotated in a clockwise direction, as viewed in FIG. 1, the integrally formed pawl 13a is also rotated overcoming the biasing force of spring 24 for disengaging the tooth 30 of the pawl 13a from one of the holes 20a of the stationary rail 12. Under this condition, since there has been no interference between the upper and lower guide rails 11, 12 the upper guide rail 11 can be slidable in the channels of the lower guide rail 12 until the seat reaches a desired forward or backward position. Usually the seat is moved by the weight of the occupant sitting thereon. Once the desired position is found, the engagement between the pawl 13a and one of the holes 20a which corresponds to the forward or backward position of the seat will be effected by only releasing the lever 13c because the pawl 13a is always biased to the engaging direction by the force of spring 24.

The tooth 30 of the pawl 13a, as well as the latch holes 20a are preferably made of rectangular shape so that the engaging force therebetween may be increased.

In the above described embodiment, the movable guide rail is disposed within the channels of the fixed guide rail, however, it should be noted that the fixed guide rail may be disposed within the channels of the movable guide rail.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vehicle seat slide adjuster comprising:
   a first moving guide rail means adapted to be secured to a vehicle seat and having a substantially inverted U-shape in section;
   a second stationary guide rail means adapted to be secured to a stationary part of the vehicle and having a substantially U-shape in section, said first movable guide rail means being slidable with respect to said second stationary guide rail means;
   a manually operable means including a round shaft portion longitudinally disposed within one inside section of said first guide rail means and rotatably supported thereby and a lever portion integrally formed at one end of said shaft portion of manual operation;
   a pawl means integrally formed at the other end of said shaft portion for limiting the relative slidable movement between said first and second guide rail means; and
   a plurality of latch holes provided on said second guide rail and aligned longitudinally thereto, each being engageable with said pawl means.

2. A vehicle seat slide adjuster as claimed in claim 1, wherein said first movable guide rail means includes a pair of inwardly opposed channels including inner surfaces at both sides thereof, said shaft portion of said manually operable means rotatably supported within the inner surfaces of one of said channels.

3. A vehicle seat slide adjuster as claimed in claim 2, wherein the other of said channels is provided with a recess for receiving therein said pawl means.

4. A vehicle seat slide adjuster as claimed in claim 3, wherein a biasing means is provided for always biasing said pawl means to engage with said latch holes, said biasing means being disposed within the one of said channels.

5. A vehicle seat slide adjuster as claimed in claim 4, wherein one end of said biasing means is bent to be supported between said two channels and the other end thereof is bent to be connected to said pawl means thereby effecting a torsional moment on said pawl means.

6. A vehicle seat slide adjuster as claimed in claim 5, wherein a roll bearing means is provided between said first and second guide rail means for effecting a slidable movement therebetween.

7. A vehicle seat slide adjuster as claimed in claim 6, wherein said roll bearing means consists of a pair of rollers rotatably disposed between said first and second guide rail means.

8. A vehicle seat slide adjuster as claimed in claim 1, wherein said shaft portion, said lever portion, and said pawl means are formed in one piece of a round metal bar.

9. A vehicle seat slide adjuster as claimed in claim 8, wherein said shaft portion is substantially covered with said first guide rail means.

10. A vehicle seat slide adjuster as claimed in claim 9, wherein said plurality of latch holes and said pawl means are rectangular shape for strengthening the engagemment therebetween.

* * * * *